Jan. 14, 1964   D. L. FEASTER ETAL   3,117,469
SPEED CHANGING GEAR MECHANISM
Filed April 9, 1962   4 Sheets-Sheet 1

Inventors:
Donavon L. Feaster,
Jabez H. Mann,
by Hood, Gust & Irish
Attorneys.

Jan. 14, 1964     D. L. FEASTER ETAL     3,117,469
SPEED CHANGING GEAR MECHANISM
Filed April 9, 1962     4 Sheets-Sheet 3
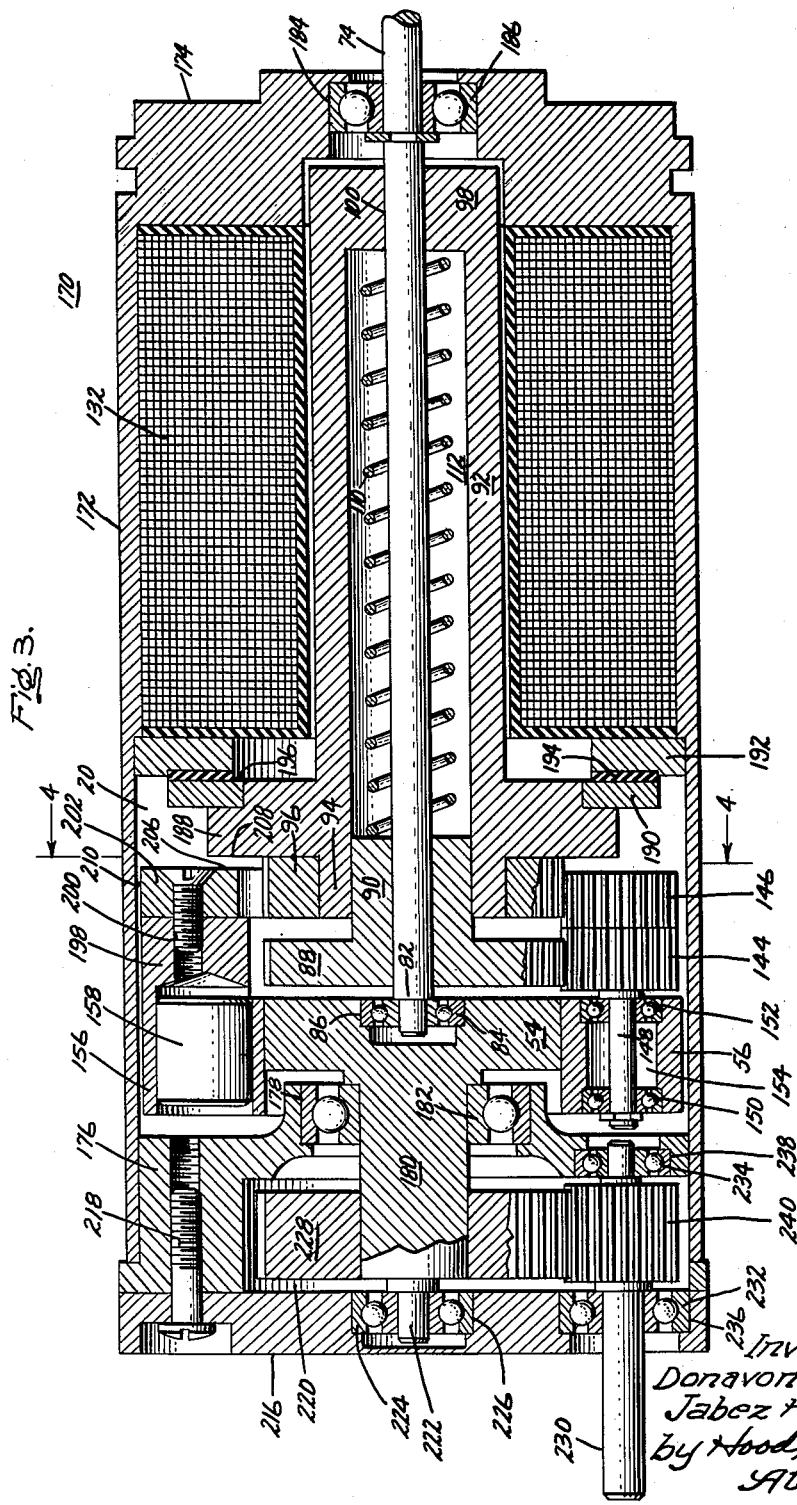
Fig. 3.
Inventors:
Donavon L. Feaster,
Jabez H. Mann,
by Hood, Gust & Irish
Attorneys.

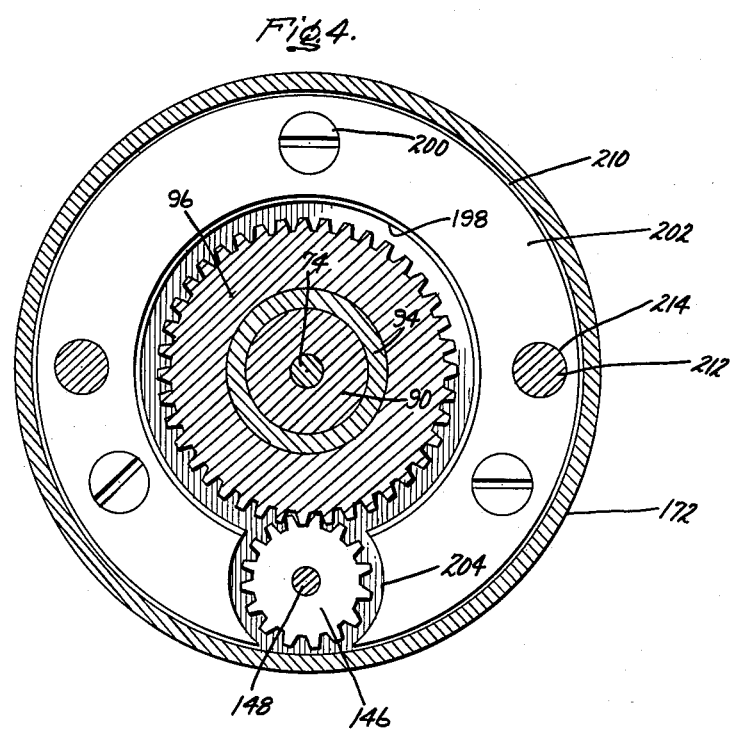

United States Patent Office 3,117,469
Patented Jan. 14, 1964

3,117,469
SPEED CHANGING GEAR MECHANISM
Donavon L. Feaster and Jabez H. Mann, Fort Wayne, Ind., assignors to Bowmar Instrument Corporation, Fort Wayne, Ind., a corporation of Indiana
Filed Apr. 9, 1962, Ser. No. 186,167
20 Claims. (Cl. 74—781)

This invention relates generally to gear mechanisms of the type which are selectively actuable to provide two different output shaft speeds in response to one input shaft speed.

A common type of speed changing gear mechanism employs a planetary gear train actuable between two different operating conditions by means of a solenoid. It is frequently desirable to provide an extremely miniaturized speed changing gear mechanism having concentric input and output shafts with the mechanism providing a one-to-one input-to-output shaft speed ratio when energized and a higher ratio when deenergized. In addition to the manufacturing problems involved in providing extremely miniaturized construction, special problems of efficiency, balance, and reliability are involved, particularly where the mechanism is required to operate at very high input shaft speeds.

It is therefore an object of our invention to provide an improved speed changing gear mechanism.

It is another object of our invention to provide an improved speed changing gear mechanism employing a planetary gear train with coaxial input and output shafts.

A further object of our invention is to provide an improved speed changing gear mechanism employing a planetary gear train and a solenoid wherein a one-to-one input-to-output shaft speed ratio is provided when the solenoid is energized and a higher ratio when the solenoid is deenergized.

Further objects and advantages of our invention will become apparent by reference to the following description and the accompanying drawings, and the features of novelty which characterize our invention will be pointed out with particularity in the claims annexed to and forming a part of the specification.

The invention in its broader aspects provides a speed changing gear mechanism employing a planetary gear train which includes two gear elements, pinion means meshing with the gear elements and mounted on a carrier element, and input and output shafts respectively connected to two of the elements. Means are provided normally restraining the third of the elements against rotation thereby providing a predetermined speed reduction ratio between the shafts. Selectively energizeable electromagnetic means is provided for disabling the restraining means and directly coupling at least two of the planetary elements for rotation in unison thereby directly connecting the shafts to provide a one-to-one speed ratio.

In the drawing,

FIG. 3 is a cross-sectional view of another embodiment of our invention; and

FIG. 4 is a cross-sectional view taken along the line 4—4 of FIG. 3.

Figure 1:
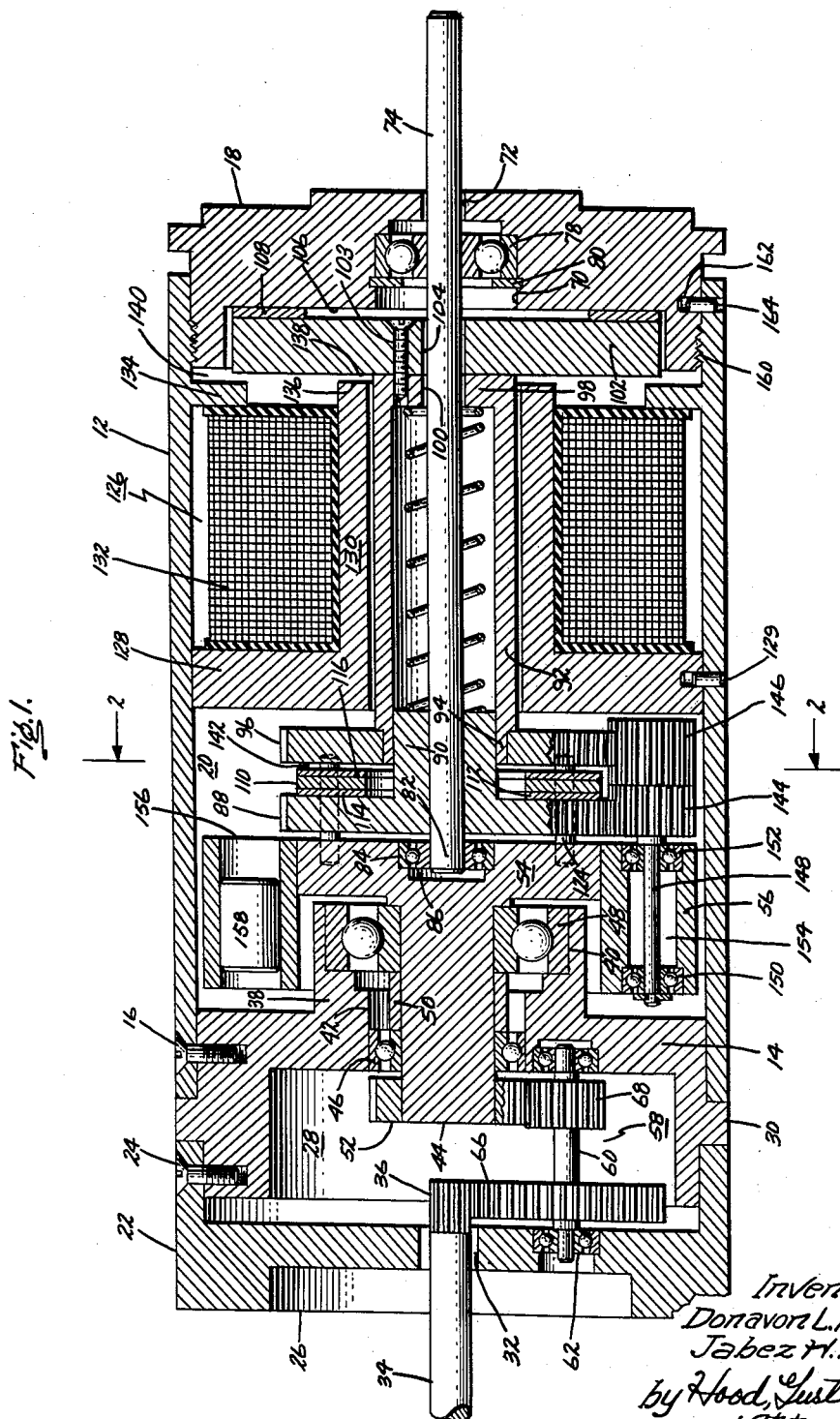
FIG. 1 is a cross-sectional view of one embodiment of a speed changing gear mechanism incorporating our invention.
Figure 2:
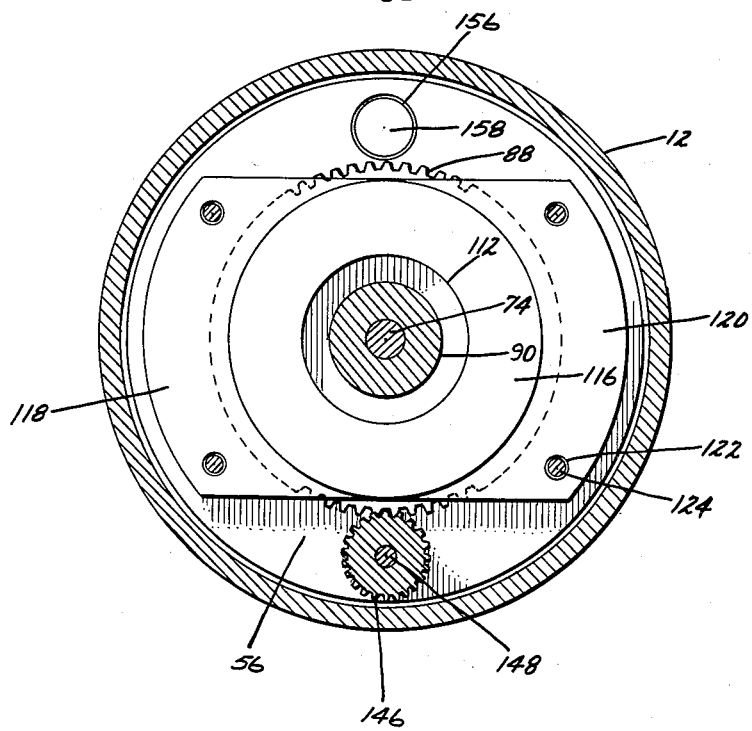
FIG. 2 is a cross-sectional view taken along the line 2—2 of FIG. 1.

Referring now to FIGS. 1 and 2 of the drawing, the speed changing gear mechanism of our invention, generally indicated at 10, comprises a first cylindrical tubular housing member 12 formed of suitable magnetic material. A first end wall 14 is secured to one end of the housing 12 in any suitable manner, as by threaded fasteners 16, and a second end wall 18 is provided secured to the other end of the housing 12, as will be hereinafter more fully described; end walls 14 and 18 define cavity 20 with housing 12. A second cylindrical tubular housing 22 is provided secured to end wall 14 in any suitable manner, as by threaded fasteners 24 and having an end wall 26 integrally formed thereon and defining cavity 28 with end wall 14, as shown. It will be seen that housing 22, housing 12 and portion 30 of end wall 14 therebetween form a uniform cylindrical outer surface for the mechanism 10.

End wall 26 has a coaxial center opening 32 formed therein and communicating with the cavity 28, opening 32 being adapted to accommodate an input shaft 34 having an input pinion 36 formed thereon and extending into cavity 28, as shown; input shaft 34 with its pinion 36 ordinarily do not form a part of mechanism 10, but on the contrary are a part of the device which drives mechanism 10, such as a servo motor.

End wall 14 has a coaxial hub portion 38 formed thereon extending into cavity 20 and having a coaxial opening 40 formed therein communicating with cavity 20. End wall 14 has a coaxial opening 42 formed therein communicating between opening 40 and cavity 28 and having a smaller diameter than opening 40. An input shaft 44 extends through openings 42 and 40 being respectively journaled therein by means of suitable anti-friction bearings 46 and 48 spaced apart by a spacing member 50. Input shaft 44 has a gear 52 secured on its end which extends into the cavity 28 and has a disk 54 formed on its end which extends into cavity 20. Secured to the outer periphery of disk 54 and rotatable therewith is an annular pinion carrier 56.

A first fixed speed reduction is provided between motor shaft 34 and input shaft 44 by means of a gear train 58 in cavity 28 of housing 22. Gear train 58 is shown here as comprising a single gear cluster having a gear cluster shaft 60 with its ends journaled respectively in suitable anti-friction bearings 62 and 64 seated in suitable openings in end walls 28 and 14, respectively. Mounted on the gear cluster shaft 60 for rotation therewith are a gear 66 which is adapted to mesh with motor pinion 36 and a pinion 68 which meshes with gear 52 on input shaft 44. It will be readily apparent that additional gear clusters may be provided in the cavity 28 forming a part of the gear train 58 to provide a predetermined fixed speed reduction between the motor shaft 34 and the input shaft 44.

End wall 18 has a coaxial center opening 70 formed therein communicating with cavity 20 and a smaller coaxial opening 72 communicating between opening 70 and the outer side of end wall 18. An output shaft 74 is provided extending through openings 72 and 70 into cavity 20 of housing 12 and is journaled for rotation in the end wall 18 by means of a suitable anti-friction bearing 78 retained in the opening 70 by means of a suitable snap ring 80. The inner end 82 of output shaft 74 is supported by a suitable anti-friction bearing 84 in opening 86 in the disc 54 on the input shaft 44. It will be seen that the motor pinion 34, input shaft 44 and output shaft 74 are coaxial.

Fixedly mounted on end 82 of output shaft 74, as by a press fit, is a first spur gear 88 having an axially extending hub portion 90. An axially extending tubular sleeve member 92 is provided having its end 94 supported on hub 90 of gear 88 for rotational and axial movement with respect thereto. A second spur gear 96 is fixedly secured to end 94 of sleeve member 92, as by a press fit, and thus is rotatable and axially movable with respect to gear 88, hub 90 and output shaft 74. The other end of sleeve member 92 has a radial flange portion 98 formed thereon with a coaxial center opening 100 formed therein through which output shaft 74 extends and which supports sleeve member 92 on the shaft 74 for rotational and axial movement with respect thereto.

A disc-shaped brake plate 102 is provided fixedly secured to sleeve member 92, as by screw 103, and has a central opening 104 through which the output shaft 74 extends. It will now be seen that spur gear 96, sleeve 92 and brake plate 102 are rigidly secured together and are thus rotatable and axially movable as a unit. Brake plate 102 extends radially outwardly adjacent radial face 106 of end wall 18. An annular band 108 of suitable braking material is adhered to the brake plate 102. A suitable coil spring 110 is disposed within the cavity 112 defined by sleeve member 92 coaxially surrounding the output shaft 74 and extending between hub 90 of gear 88 and flange 98 of sleeve 92. Spring 110 biases gear 96, sleeve 92 and brake plate 102 toward the right as viewed in FIG. 1 into a first position with the brake plate 102 causing braking engagement of the band 108 with surface 106 of end wall 18 thereby to arrest rotation of the gear 96.

Gears 88 and 96 are axially spaced apart and a clutch plate 110 is provided disposed between gears 88 and 96. Clutch plate 110 has a central coaxial opening 112 surrounding hub 90 of gear 88 and annular bands 114 and 116 of suitable material are adhered to opposite faces of the clutch plate 110. Clutch plate 110 has portions 118 and 120 extending outwardly beyond the outer periphery of gear 88 which have openings 122 formed therein. Clutch plate 110 is secured to disc 54 on input shaft 44 for rotation therewith and with pinion carrier 56 by means of axially extending pins 124 secured in the face of disc 54 and respectively extending axially therefrom and loosely through the openings 122. Thus it will be seen that the clutch plate 110 is supported for rotation with the pinion carrier and for axial movement between gears 88 and 96.

A magnetic solenoid assembly 126 is provided disposed between gear 96 and brake plate 102. Solenoid assembly 126 comprises a magnetic frame having an annular portion 128 seated in housing 12, and secured thereto by means of pin 129; and a sleeve portion 130 coaxially surrounding sleeve 92. A suitable annular coil 132 is wound on the outer surface of sleeve 130 and is adapted to be selectively energized through suitable leads (not shown) from an external source of potential. An annular flange portion 134 extends radially inwardly from housing 12 and abuts coil 132, as shown. It will be seen that in the first position of brake plate 102 with the braking band 108 in engagement with surface 106 of end wall 18, the end 136 of sleeve 130 and the flange 134 respectively define air gaps 138 and 140 with the brake plate 102; the brake plate 102 is formed of suitable magnetic material and thus completes a magnetic circuit for the coil 132. When the coil 132 is energized, brake plate 102 is attracted toward end 136 of sleeve 130 and flange 134 thereby moving sleeve 92 and gear 96 axially toward the left as viewed in FIG. 1 and into a second position in which the face of gear 96 engages band 116 of clutch plate 110 in turn causing band 114 to engage the face of gear 88 thereby directly coupling gears 88 and 96. It will be seen in FIG. 1 that the normal spacing 142 between band 116 and the face of gear 96 when the coil 132 is deenergized is less than the axial length of air gaps 138 and 140 and thus, when coil 132 is energized and gear 96, sleeve 92 and brake plate 102 move to their second position as above described, the air gaps 138 and 140 will not be closed, thus permitting brake plate 102 in its second position to rotate with sleeve 92, gears 88 and 96, clutch plate 110 and disc 54; if brake plate 102 in its second position engaged flange 134 and end 136, it would be locked against rotation.

A pair of pinions 144 and 146 are provided respectively fixedly secured together and meshing with spur gears 88 and 96. Pinions 144 and 146 are in turn mounted on a pinion shaft 148 rotatably supported on the pinion carrier 56 by means of suitable anti-friction bearings 150 and 152 seated in an axially extending opening 154 in the pinion carrier 56.

In order to counterbalance the weight of the pinions 144 and 146 together with the pinion shaft 148 and bearings 150 and 152, an axially extending opening 156 is formed in pinion carrier 56 diametrically opposite from the opening 154 and a pin or plug 158 of predetermined length is inserted in the opening 156 to provide the requisite counterbalancing. It will be readily apparent that pins 158 of different lengths may be provided in the opening 156 to provide proper counterbalancing for different sets of pinions.

It will be readily apparent that the pinion carrier 56, pinions 144 and 146, and spur gears 88 and 96 provide a planetary gear train; the gear 88 may be said to be the sun gear, the gear 96 can be said to be the ring gear, the gears 144 and 146 the planets, and the carrier 56 the planet cage.

It will be readily seen that when the coil 132 is energized thus moving gear 96, sleeve 92 and brake plate 102 to their second positions, the braking engagement of brake plate 102 and brake band 108 with the end wall 18 is released and gears 88 and 96 and pinion carrier 56 are directly coupled together for rotation in unison by virtue of the engagement of gear 96 with band 116 on clutch plate 110, the engagement of band 114 with gear 88, and the connection of clutch plate 110 to disc 54 by pins 124. With gears 88 and 96 and pinion carrier 56 directly connected together, rotation of the input shaft 44 and pinion carrier 56 will result in gears 88 and 96 being rotated in unison with input shaft 44 and therefore, output shaft 74 is directly connected to input shaft 44. When coil 132 is deenergized thus causing the braking plate 102 under the influence of spring 110 to cause braking engagement of the brake band 108 with the end wall 18, gear 96 is secured against rotation and thus, rotation of input shaft 44 will result in pinions 144 and 146 cooperating respectively with gears 88 and 96 to provide the aforementioned speed reduction.

It will be seen that the end wall 18 has a threaded engagement with housing 12, as at 160, which permits initial adjustment of the air gaps 138 and 140. Following initial adjustment, radial opening 162 is bored through housing 12 into end wall 18 and pin 164 inserted therein thereby to secure end wall 18 to the housing 12 at the proper location.

Referring now to FIGS. 3 and 4 in which like elements are indicated by like reference numerals, there is shown another embodiment of our invention, generally indicated at 170, having a cylindrical housing member 172 formed of suitable magnetic material and having end wall 174 integral therewith. Another end wall 176 is provided at the end of housing 172 remote from end wall 174, and secured thereto in any suitable manner, as by means of screws 16 (not shown) of FIG. 1; end walls 176 and 174 define cavity 20 with housing 172.

End wall 176 has a coaxial center opening 178 formed therein through which input shaft 180 extends; input shaft 180 is rotatably supported by means of suitable anti-friction bearing 182 seated in opening 178. Shaft 180 extends into housing cavity 20, and has annular disc 54 formed thereon which in turn has pinion carrier 56 secured to its outer periphery.

Coaxial center opening 184 is formed in end wall 174 through which output shaft 74 extends. Output shaft 74 is rotatably supported by bearing 186 seated in opening 184. Output shaft 74 is coaxial with input shaft 180 and extends into cavity 20 with its end 82 being rotatably supported by bearing 84 seated in opening 86 in the disc 54.

Gear 88 having hub 90 is secured to end 82 of output shaft 74, as by a press fit, so as to rotate therewith. Sleeve 92, formed of suitable magnetic material has one end 94 supported on hub 90 of gear 88 for rotational and axial movement with respect thereto. A second gear 96 is secured to end 94 of sleeve 92, as by a press fit, for rotational and axial movement therewith. The other end 98 of sleeve 92 has a coaxial center opening 100 formed therethrough, through which the output shaft 74 extends, the end 98 of sleeve 92 being supported thereon for rotational and axial movement with respect thereto. Sleeve 92 again defines cavity 112 coaxial with output shaft 74 and coil spring 110 surrounds shaft 74 within cavity 112 extending between hub 90 and end 98 of sleeve 92; spring 110 normally biases sleeve 92 and gear 96 to the position shown in FIG. 3.

Sleeve 92 has an annular disc portion 188 formed thereon which in turn has an annular brake plate 190 formed of non-magnetic material secured thereto. An annular braking member 192 formed of non-magnetic material is secured within housing 172 and has an annular band 194 of suitable braking material adhered thereto. It will be seen that in the position shown in FIG. 3, the radial face 196 of brake member 190 is urged into braking engagement with the corresponding radial surface of brake band 194 by the spring 110 thus arresting rotation of sleeve 92 and gear 96.

A suitable annular coil 132 is positioned within housing 172 between the braking member 192 and the end wall 174 and coaxially surrounding sleeve 92, coil 132 being adapted to be selectively energized through suitable leads (not shown) from an external source of potential.

Pinion carrier 56 has an opening 154 formed therein which supports bearing 150 and 152 which in turn rotatably support pinion shaft 148. Pinions 144 and 146 which are fixedly secured together are mounted on pinion shaft 148 and respectively mesh with the gears 88 and 96. It will now be seen that with coil 132 deenergized and thus with sleeve 92 being biased to its first position by spring 110 so that brake member 190 is in braking engagement with brake band 194 and braking member 192, gear 96 is held stationary and thus rotation of input shaft 180 will result in the pinions 144 and 146 cooperating in conventional planetary fashion with gears 88 and 96 to rotate gear 88 and output shaft 74 with a predetermined speed reduction ratio.

In this embodiment, pinion carrier 56, which may be formed of non-magnetic material, has a part-annular portion 198 formed thereon which partially coaxially surrounds gear 88, but which has an opening formed therein for accommodating pinions 144 and 146. Secured to part-annular portion 198 of pinion carrier 56 by means of suitable threaded fasteners 200 is a part-annular clutch member 202. Clutch member 202 partially surrounds gear 96 with opening 204 being formed therein to accommodate pinion 146. It will be seen that clutch member 202 has a radial face 206 which is an axial alignment with radial surface 208 of disc portion 188 of sleeve member 92. It will also be seen that the outer peripheral surface of clutch member 202 defines a radial air-gap 210 with housing member 172.

It will now be seen that the magnetic circuit for the solenoid coil 132 comprises end wall 174, sleeve 92, disc 188, clutch member 202, and housing 172. Thus, when coil 132 is energized, disc 188 of sleeve 92 is moved axially so that its radial surface 208 engages radial face 206 of clutch member 202; this movement of sleeve member 92 from its first to its second position responsive to energization of coil 132, releases the braking engagement of brake member 190 with brake band 194. It will now be seen that with coil 132 energized, disc 188 of sleeve 92 is moved into engagement with clutch member 202 which in turn is attached to the pinion carrier 56. Thus, it will be seen that the input shaft 180, pinion carrier 56, gears 88 and 96 and output shaft 74 are directly connected together so that rotation of the input shaft 180 results in direct rotation of output shaft 74 with a one-to-one speed ratio.

Pinion carrier 56 again has an opening 156 formed therein diametrically opposite from pinion shaft 148 in which a counterweight 158 of suitable length is positioned. In order to insure concentricity of the clutch member 202 with respect to the pinion carrier and also concentricity of the air-gap 210, the pinion carrier 202 is preferably initially located with respect to the pinion carrier portion 198 by means of suitable dowel pins 212 which extend through suitable openings 214 formed in the clutch plate 202 and the pinion carrier portion 198. With clutch plate 202 thus properly located, the openings for the screws 200 are drilled and tapped and the screws 200 then inserted.

In this embodiment, another end wall 216 is provided secured to end wall 176 in any suitable manner, as by threaded fasteners 218 and defining therewith cavity 220. Input shaft 180 extends into cavity 220 and has its end 222 rotatably supported by a suitable bearing 224 seated in an opening 226 in the end wall 216. Input gear 228 is mounted on input shaft 180 in cavity 220 for rotation therewith. In order to drive input gear 228 and input shaft 180, a drive shaft 230 is provided extending into cavity 220 and rotatably supported by suitable bearings 232 and 234 seated in openings 236 and 238 respectively and end walls 216 and 176. A drive pinion 240 is mounted on shaft 230 for rotation therewith, and meshes with the input gear 228 so as to drive the same. It will be seen that this input gear-reduction arrangement of FIG. 3 provides an input shaft which is eccentric with respect to the output shaft whereas the input gear-reduction arrangement of FIG. 1 provides an input shaft which is concentric with the output shaft. It is readily apparent that the eccentric input shaft gear-reduction arrangement of FIG. 3 and the concentric input shaft gear-reduction arrangement of FIG. 1 may be used interchangeably.

Referring again to the embodiment of FIGS. 1 and 2, it will be readily apparent that with this embodiment, a complete solenoid assembly including an outer annular magnetic ring may be slipped into housing 12 in which case the housing 12 may be formed of non-magnetic material. It will be seen that in both embodiment of the invention, the housing need not necessarily be cylindrical in cross-section, but on the contrary may have any other desired cross-sectional configuration such as square or octagonal.

While in both embodiments herein illustrated, the input and output shafts of the planetary two-speed mechanism extend through opposite end walls of the housing, it will be readily seen that since the shafts are concentric, one of the shafts may be journaled within the other so that they both extend through the same end wall of the housing. Also, while in both embodiments the pinions 144 and 146 are illustrated as being formed separately and as having different numbers of teeth, it will be readily understood that the pinions 144 and 146 may in fact be integrally formed as a single pinion having the same number of teeth meshing with both gears 88 and 96, in which case the teeth of gears 88 and 96 must necessarily differ in number. It will be readily seen that further speed-reduction gearing may be provided at the output end of either embodiment, i.e., driven by the output shaft 74.

It will further be seen that spring configurations other than the coil springs 110 may be employed for urging the sleeve 92 into its first braking position.

While we have illustrated and described specific embodiments of our invention, further modifications and improvements will occur to those skilled in the art, and we desire therefore in the appended claims to cover all modifications which do not depart from the spirit and scope of our invention.

What is claimed is:

1. A speed changing gear mechanism comprising: a housing; a first shaft rotatably mounted in said housing and having a pinion carrier on one end thereof and rotatable therewith; a second shaft rotatably mounted in said housing coaxial with said first shaft and having a first spur gear thereon and rotatable therewith; a second spur gear mounted on said second shaft for rotation and axial movement with respect thereto and axially spaced from said first gear; brake plate means secured to said second gear and rotatable and axially movable therewith, said brake plate means and second gear being axially movable between first and second positions; two coaxial pinions fixedly secured together in end-to-end relationship and mounted on a pinion shaft, said pinion shaft being mounted on said carrier, said pinions respectively meshing with said first and second gears to provide a planetary gear train; said brake plate means in said first position thereof having a braking engagement with a surface which is fixed with reference to said housing thereby arresting rotation of said brake plate means and second gear whereby rotation of said first shaft causes said pinions to rotate said first gear and second shaft with a predetermined speed reduction ratio; resilient means normally urging said brake plate means and second gear into said first position thereof; clutch plate means on said pinion carrier and rotatable therewith; means rotatable with said second gear and engaging said clutch plate means in said second position of said second gear thereby directly coupling said second gear and pinion carrier whereby said second shaft is directly coupled to said first shaft and rotatable therewith; and selectively energizeable solenoid means arranged when energized to move said second gear and brake plate means to said second positions thereof.

2. A speed changing gear mechanism comprising: a housing having axially spaced opposite end walls; a first shaft rotatably journaled in one end wall and having one end extending into said housing; a pinion carrier in said housing mounted on said one end of said first shaft and rotatable therewith; a second shaft rotatably journaled in the other end wall and coaxial with said first shaft, said second shaft having one end extending into said housing and journaled in said pinion carrier; a first spur gear in said housing mounted on said one end of said second shaft and rotatable therewith; a second spur gear in said housing mounted on said one end of said second shaft for rotational and axial movement with respect thereto; a brake plate in said housing secured to said second gear for rotational and axial movement therewith, said brake plate and second gear being axially movable between first and second positions; two coaxial pinions fixedly secured together in end-to-end relationship and mounted on a pinion shaft, said pinion shaft being mounted on said carrier, said pinions respectively meshing with said first and second gears to provide a planetary gear train; said brake plate in said first position thereof having a braking engagement with a wall of said housing thereby arresting rotation of said brake plate and second gear whereby rotation of said first shaft causes said pinions to rotate said first gear and second shaft with a predetermined speed reduction ratio; spring means normally urging said brake plate and second gear into said first position thereof; a clutch plate secured to said pinion carrier and rotatable therewith; said second gear having a portion engaging said clutch plate in said second position of said second gear thereby directly coupling said second gear and pinion carrier whereby said second shaft is directly coupled to said first shaft and rotatable therewith; and selectively energizeable solenoid means in said housing and coaxially surrounding said second shaft, said solenoid means being arranged when energized to move said second gear and said brake plate to said second positions thereof.

3. The combination of claim 2 wherein said first gear has a hub portion, and further comprising an elongated sleeve member coaxially surrounding said second shaft, said second gear and brake plate being secured to said sleeve member, one end of said sleeve member being rotatably mounted on said hub portion for axial movement with respect thereto, the other end of said sleeve member being rotatably mounted on said second shaft for axial movement with respect thereto, said spring surrounding said second shaft within said sleeve member and extending between said hub portion and said other end of said sleeve member, said solenoid means surrounding said sleeve member and acting upon one of said brake plate and second gear.

4. The combination of claim 1 wherein said pinion carrier is annular with an axially extending opening formed therein, and further comprising a balance weight member seated in said pinion carrier opening, said pinion carrier opening being so located and the length of said balance weight member being predetermined to counterbalance said pinions and pinion shaft.

5. The combination of claim 1 wherein said first shaft is the input shaft and has a third gear thereon and rotatable therewith for driving the same, and further comprising a gear train in said housing operatively connected to said third gear for driving the same and adapted to be connected to another input shaft and to be driven thereby.

6. The combination of claim 1 wherein said solenoid means is disposed between said brake plate and second gear.

7. A speed changing gear mechanism comprising: a housing; a first shaft rotatably mounted in said housing and having a pinion carrier on one end thereof and rotatable therewith; a second shaft rotatably mounted in said housing coaxial with said first shaft and having a first spur gear thereon and rotatable therewith; a second spur gear mounted on said second shaft for rotation and axial movement with respect thereto and axially spaced from said first spur gear; a brake plate axially spaced from said second gear and secured thereto for rotational and axial movement therewith, said brake plate and second gear being axially movable between first and second positions; two coaxial pinions fixedly secured together in end-to-end relationship and mounted on a pinion shaft, said pinion shaft being mounted on said pinion carrier, said pinions respectively meshing with said first and second gears and cooperating therewith to provide a planetary gear train; said brake plate in said first position thereof having a braking engagement with a portion of said housing thereby arresting rotation of said brake plate and second gear whereby rotation of said first shaft causes said pinions to rotate said first gear and second shaft with a predetermined speed reduction ratio; resilient means normally urging said brake plate and second gear into said first position thereof; a clutch plate disposed between said first and second gears for axial movement with respect thereto; means securing said clutch plate to said pinion carrier for rotation therewith, said clutch plate engaging both of said gears in said second position of said second gear thereby directly coupling said first and second gears and said pinion carrier whereby said second shaft is directly coupled to said first shaft and rotatable therewith; and selectively energizeable solenoid means arranged when energized to move said second gear and brake plate to said second position thereof.

8. A speed changing gear mechanism comprising: a housing having axially spaced opposite end walls; a first shaft rotatably journaled in one end wall and having one end extending into said housing; a pinion carrier in said housing mounted on said one end of said first shaft and rotatable therewith; a second shaft rotatably journaled in the other end wall and coaxial with said first shaft, said second shaft having one end extending into said housing and journaled in said pinion carrier; a first spur gear in said housing mounted on said one end of said second shaft and rotatable therewith; a second spur gear in said housing mounted on said one end of said second shaft for rotational and axial movement with respect thereto and axially spaced from said first spur gear toward said other end wall; a brake plate in said housing adjacent said other end wall and axially spaced from said second spur gear, said brake plate being mounted on said second shaft for rotation and axial movement with respect thereto; a sleeve member coaxially surrounding said second shaft and extending axially between said second spur gear and brake plate, said sleeve member being fixedly secured to said second spur gear and brake plate respectively; said second spur gear, brake plate and sleeve member being axially movable between first and second positions; two coaxial pinions fixedly secured together in end-to-end relationship and mounted on a pinion shaft, said pinion shaft being mounted on said pinion carrier, said pinions respectively meshing with said first and second gears and cooperating therewith to provide a planetary gear train; said brake plate in said first position thereof having a braking engagement with said other end wall thereby arresting rotation of said brake plate and second spur gear whereby rotation of said first shaft causes said pinions to rotate said first gear and second shaft with a predetermined speed reduction ratio; spring means normally urging said brake plate and second spur gear into said first position thereof; a clutch plate coaxially surrounding said second shaft between said first and second spur gears; means securing said clutch plate to said pinion carrier for rotation therewith and for axial movement with respect to said first and second spur gears; said second spur gear in said second position thereof having a clutching engagement with said clutch plate and urging the same into clutching engagement with said first spur gear thereby directly coupling said first and second spur gears and said pinion carrier whereby said second shaft is directly coupled to said first shaft and rotatable therewith; and selectively energizeable solenoid means in said housing between said second spur gear and brake plate and coaxially surrounding said sleeve member for moving said second spur gear and brake plate to said second position thereof.

9. The combination of claim 8 wherein said brake plate is an annular disc and said solenoid means comprises an annular magnetic structure and an annular coil thereon, said magnetic structure having an annular portion spaced from said other end wall, said brake plate being disposed between said other end wall and said magnetic structure portion and magnetically cooperating therewith, said brake plate defining annular air gaps with said magnetic structure portion in both positions thereof.

10. The combination of claim 8 wherein said clutch plate has annular clutch faces on opposite sides thereof cooperating respectively with said first and second spur gears, said clutch plate having portions extending respectively outwardly beyond the periphery of said first spur gear, said clutch plate having axial openings formed therein, and wherein said means securing said clutch plate to said pinion carrier comprises axially extending pins secured to said pinion carried and respectively loosely extending through said openings in said clutch plate portions.

11. The combination of claim 2 wherein said first shaft is the input shaft, and further comprising another housing connected to said first-named housing and having an end wall spaced axially from said one end wall of said first-named housing, said first shaft having its other end extending into said other housing, a third gear in said other housing mounted on said other end of said first shaft and rotatable therewith for driving the same, said end wall of said other housing having an opening formed therein coaxial with said first shaft for receiving an input pinion, and a gear train in said other housing comprising at least one gear cluster having a shaft with a pinion and gear thereon, said gear cluster shaft being journaled in said other housing end wall and said one end wall of said first-named housing, said gear cluster pinion meshing with said third gear for driving the same, said gear cluster gear being adapted to be driven by said input pinion.

12. The combination of claim 1 wherein said solenoid means magnetically acts upon said brake plate means to move the same and said second gear to said second position thereof.

13. The combination of claim 1 wherein said surface is defined by a wall in said housing and wherein said solenoid means is on the side of said wall remote from said brake plate means.

14. The combination of claim 1 wherein said means rotatable with said second gear and said clutch plate means form part of the magnetic circuit of said solenoid means and said solenoid means magnetically acts upon said second gear to move the same and said brake plate means to said second positions thereof.

15. The combination of claim 2 wherein said housing wall which is engaged by said brake plate is intermediate said end walls, and wherein said solenoid means is disposed between said intermediate wall and said other end wall.

16. The combination of claim 2 wherein said brake plate comprises an annular disc directly secured to said second gear and having a radial face, said housing wall which is engaged by said brake plate being intermediate said end walls and having a radial braking surface formed thereon, said disc face and braking surface having axial engagement, said solenoid means being disposed between said intermediate wall and said other end wall, said clutch plate comprising a part-annular disc partially surrounding said second gear and having an opening therein for accommodating said pinions, said clutch plate having a radial face, said portion of said second gear comprising a radial surface which axially engages said clutch plate face.

17. A speed changing gear mechanism comprising: a housing formed of magnetic material and having axially spaced opposite end walls; a first shaft rotatably journaled in one end wall and having one end extending into said housing; a pinion carrier in said housing mounted on one end of said first shaft and rotatable therewith; a second shaft rotatably journaled in the other end wall and coaxial with said first shaft, said second shaft having one end extending into said housing and journaled in said pinion carrier; a first spur gear in said housing mounted on said one end of said second shaft and rotatable therewith, said first gear having a hub portion extending toward said other end wall; a sleeve member formed of magnetic material surrounding said second shaft, said sleeve member having one end rotatably mounted on said hub portion for axial movement with respect thereto, said sleeve member extending axially toward said other end wall and having its other rotatably mounted on said second shaft for axial movement with respect thereto; a second spur gear mounted on said one end of said sleeve member for rotational and axial movement therewith; said sleeve member having an annular disc portion formed on said one end and having opposite radial surfaces extending respectively beyond the periphery of said second gear; said sleeve member and second gear being axially movable between first and second positions; two coaxial pinions fixedly secured together in end-to-end relationship and mounted on a pinion shaft, said pinion shaft being mounted on said pinion carrier and said pinions respectively meshing with said first and second gears and cooperating therewith to provide a planetary gear train; a braking member secured to said housing between said disc portion and other end wall and axially spaced therefrom, said braking member having a radial face; one radial surface of said disc portion and said radial face of said braking member having a braking engagement in said first position of said sleeve member thereby arresting rotation of said second gear whereby rotation of said first shaft causes said pinions to rotate said first gear and second shaft with a predetermined speed reduction; a spring surrounding said second shaft within said sleeve member with its ends engaging said hub portion and the other end of said sleeve member thereby normally biasing said sleeve member to said first position thereof; a part-annular clutch member secured to said pinion carrier and partially surrounding said second gear, said clutch member having an opening therein for accommodating said pinions and a radial face, said radial face of said clutch member engaging the other radial surface of said disc portion when said sleeve member is in said second position thereof thereby directly coupling said second gear and pinion carrier whereby said second shaft is directly coupled to said first shaft and rotatable therewith; the outer periphery of said clutch member defining a radial airgap with said housing; and an annular selectively energizable solenoid coil in said housing between said braking member and other end wall and coaxially surrounding said sleeve member; said sleeve member, disc portion, clutch member and other end wall forming the magnetic circuit for said coil, said coil when energized acting upon said disc portion thereof to move said sleeve member to said second position thereof.

18. The combination of claim 17 wherein said disc portion has an annular member secured thereto and defining said one radial surface thereof which has a braking engagement with said one radial face of said braking member, at least one of said last two named members being formed of non-magnetic material.

19. The combination of claim 17 wherein said pinion carrier has a part-annular portion formed thereon partially surrounding said first gear and with an opening therein accommodating said pinions, said clutch member being secured to said pinion carrier portion by threaded fastener means; and dowel pins seated in openings in said clutch member and pinion carrier for providing concentricity of said clutch member with reference to said pinion carrier and housing thereby to maintain said radial airgap concentric.

20. The combination of claim 2 wherein said first shaft is the input shaft, and further comprising another housing connected to said first-named housing and having an end wall spaced axially from said one end wall of said first-named housing, said first shaft having its other end extending into said other housing and journaled in the end wall thereof, a third gear in said other housing mounted on said other end of said first shaft and rotatable therewith for driving the same, another input shaft extending into said other housing and journaled in said end wall thereof and in said one end wall of said first-named housing, and a fourth gear in said other housing mounted on said other input shaft and rotatable therewith, said fourth gear meshing with said third gear for driving the same.

References Cited in the file of this patent

UNITED STATES PATENTS

| | | |
|---|---|---|
| 437,067 | Whiton | Sept. 23, 1890 |
| 936,284 | Abernethy | Oct. 12, 1909 |
| 2,267,114 | Lear et al. | Dec. 23, 1941 |
| 2,966,809 | Derylo | Jan. 3, 1961 |
| 2,984,126 | Feaster | May 16, 1961 |

FOREIGN PATENTS

| | | |
|---|---|---|
| 317,153 | Germany | Dec. 12, 1919 |
| 683,162 | France | Feb. 23, 1930 |

UNITED STATES PATENT OFFICE
CERTIFICATE OF CORRECTION

Patent No. 3,117,469                                January 14, 1964

Donavon L. Feaster et al.

It is hereby certified that error appears in the above numbered patent requiring correction and that the said Letters Patent should read as corrected below.

Column 9, line 50, for "carried" read -- carrier --; column 10, line 46, after "other" insert -- end --.

Signed and sealed this 9th day of June 1964.

(SEAL)
Attest:

ERNEST W. SWIDER
Attesting Officer

EDWARD J. BRENNER
Commissioner of Patents